FIG-3

REVERSE ARCHING DEFLECTION

INVENTORS
ELVIN G. BOICE
LIP FOU WONG

BY

THEIR ATTORNEYS

United States Patent Office 3,429,169
Patented Feb. 25, 1969

3,429,169
APPARATUS FOR AND METHOD OF STRAIGHTENING BOW MEANS IN AN ELONGATED MEMBER
Elvin G. Boice and Lip Fou Wong, Richmond, Va., assignors to Reynolds Metals Company, Richmond, Va., a corporation of Delaware
Filed Mar. 3, 1967, Ser. No. 620,540
U.S. Cl. 72—297                    36 Claims
Int. Cl. B21d 11/02, 3/00, 9/05

ABSTRACT OF THE DISCLOSURE

This disclosure relates to an improved apparatus for and method of removing bow means in an elongated member such as an elongated pipe wherein such pipe is supported so that its bow means is accessible and deforming means such as peening hammer means is utilized to peen the pipe in path means adjacent the line of maximum concave curvature of such bow means to cause a change in the structure of such pipe along such path means which creates compressive fiber stresses in such pipe which straighten such bow means.

---

This invention relates to straightening of elongated members and more particularly to an improved apparatus for and method of straightening bow means in metal pipe, or the like.

There are many industrial applications where it is necessary to use elongated members having a comparatively small cross-sectional dimension of a few inches and an overall length of many feet. Generally it is important to keep such elongated members in a straight condition to enable efficient use thereof. Particularly, in the well drilling industry, for example, many sections of tubular drill pipe are used in a drill string and it is very important that each section of pipe be kept straight to preclude the danger of wearing thin on the convex side of bow means that may be present in a given section. Drill pipe may become bowed during transportation, handling, or during service in a drill string. Also, it has been found through field experience that a large percentage of pipe sections are bowed in a large gradual bow which occurs generally along the middle portion of the particular pipe section. Nevertheless, irrespective of the manner in which pipe is bowed or the type of bow present, it is extremely important to keep the drill pipe straight and in order to operate the drill string efficiently and economically it is necessary to straighten as much of the bowed drill pipe as possible and preferably such straightening should be achieved at the drilling site.

The improved apparatus and method of this invention to be hereinafter described is very effective in straightening aluminum pipe. The technique presently used to straighten steel pipe, for example, is not applicable to the straightening of aluminum pipe. In straightening steel pipe, a hydraulic press (called a gag press) is used to remove short bends or kinks by applying forces at the apex of the bend or kink. If this technique is used to straighten aluminum pipe, the yield strength of the aluminum pipe would be exceeded and it would fracture. When aluminum pipe develops short bends or kinks it is discarded. However, when it develops long bows which extend substantially along the full length of the elongated pipe, the technique of this invention may be practiced.

Accordingly, it is a feature of this invention to provide an improved apparatus of simple and economical construction for removing bow means in an elongated member.

Another feature of this invention is to provide an inexpensive portable apparatus for removing bow means in elongated drill pipe which is capable of being easily erected and effectively used at a well drilling site.

Another feature of this invention is to provide an improved apparatus for removing bow means in elongated metal pipe using simple deforming means such as peening means for peening such pipe in path means adjacent the line of maximum concave curvature of such bow means to cause a change in the structure of the pipe along such path means which creates forces within the pipe which remove the bow means.

Another feature of this invention is to provide a simple and inexpensive method of removing bow means in an elongated member.

Another feature of this invention is to provide such a method particularly adapted for straightening elongated tubular drill pipe at the drilling site.

Another feature of this invention is to provide an improved method of removing, i.e., straightening, bow means in an elongated drill pipe which can be achieved by comparatively unskilled personnel and which can be achieved without damaging the drill pipe.

Another feature of this invention is to provide an improved method of removing bow means in an elongated drill pipe which uses simple peening means to peen such pipe in path means adjacent the line of maximum concave curvature of such bow means to cause a change in the structure of such pipe along such path means which creates forces to counteract the forces tending to bow the pipe.

Another feature of this invention is to provide an improved method of the character mentioned wherein such peening means is used to peen such pipe in a plurality of overlaid passes defining such path means.

Another feature of this invention is to provide an improved method of the character mentioned wherein such peening means is used to peen such pipe in a plurality of parallel spaced apart passes defining such path means.

Therefore, it is an object of this invention to provide an improved apparatus for and method of removing or straightening bow means in an elongated member having one or more of the novel features of this invention as set forth above or hereinafter shown or described.

Other objects, uses, and advantages of this invention are apparent from a reading of this description which proceeds with reference to the accompanying drawings forming a part thereof and wherein:

While the various features of this invention are hereinafter illustrated and described as being particularly adaptable for providing an improved apparatus for and method of removing or straightening bow means in an elongated member such as tubular drill pipe, for example, it is to be understood that the various features of this invention can be utilized singly or in any combination thereof to provide an improved apparatus for and method of straightening elongated members having all types of cross-sectional configurations.

Therefore, this invention is not to be limited to only the embodiments illustrated in the drawings, because the drawings are merely utilized to illustrate one example of the wide variety of uses of this invention.

The term peening means is used throughout this disclosure to describe means used to deform an elongated member such as a drill pipe along its surface means; however, it is to be understood that the term peening means includes any suitable means which may be used to work surface means of a bowed elongated member to create forces such as compressive fiber stresses therewithin which remove the bow in such elongated member. Also, the term peening used in this disclosure includes any suitable compressive working of surface means of an elongated member whether produced by impact, rolling pressure contact, or other suitable technique.

Figure 1:
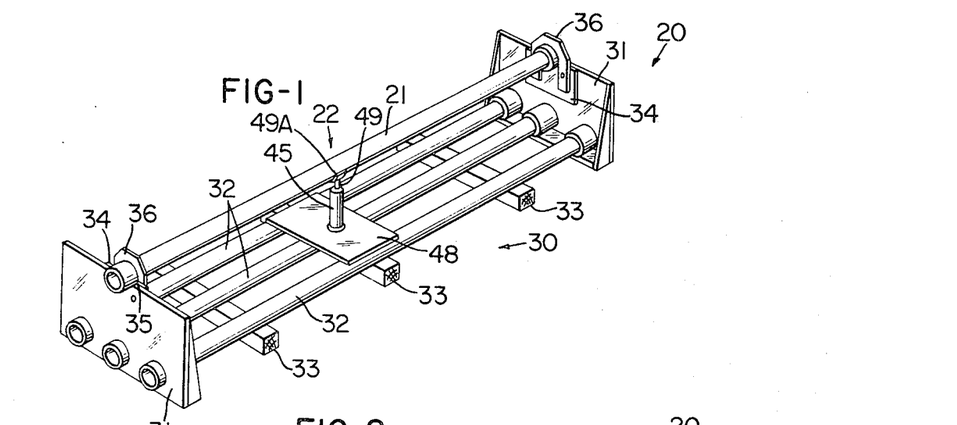
FIGURE 1 is a perspective view illustrating one exemplary embodiment of the improved apparatus of this invention and showing a pipe to be straightened supported in position on such apparatus so that bow means therein is arranged in an upwardly concave manner.

In the exemplary embodiment of this invention illustrated in FIGURE 1 of the drawings, an improved straightening apparatus designated generally by the numeral 20 is shown. Apparatus 20 is particularly adapted for straightening an elongated member shown in this example of the invention as an elongated tubular pipe designated by the numeral 21 and having bow means shown as a bent or bowed portion along the central portion thereof and designated generally by the numeral at 22.

Figure 2:
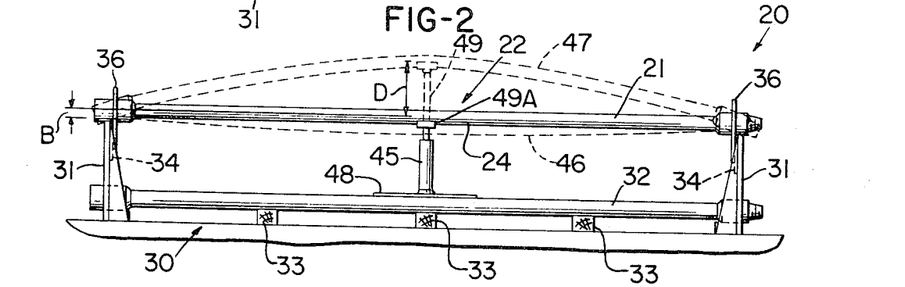
FIGURE 2 is a side elevation showing the pipe of FIGURE 1 being bowed or reverse arched from its normally upwardly concave curvature to an upwardly convex curvature to enable peening therealong to thereby straighten such pipe more rapidly.
Figure 6:
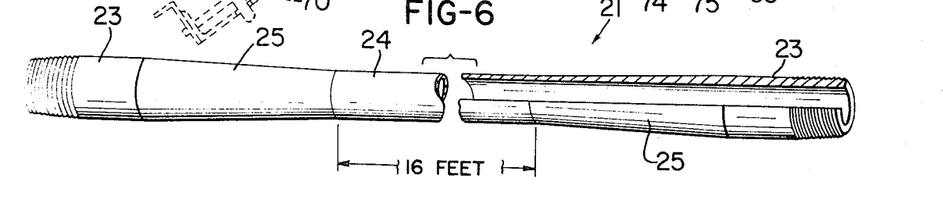
FIGURE 6 is a perspective view with parts in section and parts broken away of pipe of FIGURES 2 and 4 after straightening thereof.

The exemplary pipe 21 is shown in its straightened form in FIGURE 6 of the drawings and comprises an aluminum pipe of known configuration and having a pair of comparatively heavy ends designated by the numeral 23 and a central portion comprising the major length of pipe 21 and designated by the numeral 24. A pair of tapered transition sections is provided between the heavy ends 23 and central portion 24 and the entire pipe with its central portion 24, transition portions 25, and heavy ends 23 is formed as a single structural unit. As seen in FIGURES 1 and 2 of the drawings, bow 22 is provided in the central portion 24 of pipe 21 in this example of the invention.

Exemplary apparatus 20 has supporting means for supporting pipe 21 so that the concave surface of its bowed portion 22 is easily accessible and comprises a base designated generally by the numeral 30 and a pair of symmertically arranged vertically arranged supports at opposite ends of base 30 and each designated by the numeral 31. Base 30 may be formed of any suitable material and is preferably formed of a plurality of straight pipe sections similar to pipe 21 each designated by the numeral 32 and each being supported and attached in a fixed manner on transverse pieces such as transverse timbers each designated by the numeral 33. Vertical supports 31 are held in position in any suitable fixed manner at the opposite ends of each pipe 32 and it will be appreciated that a strong rigid structure is thus provided which can be made from materials available at a drilling site.

Each vertical member 31 has a plate 34 fixed along its upper end portion and each plate 34 together with the upper end portion of vertical support 31 has a cutout provided therein which defines a substantially semicylindrical bearing surface 35. Each bearing surface 35 is particularly adapted to support an associated end of pipe 21 therewithin in nested relation.

Substantially inverted U-shaped collar means shown as a pair of U-shaped collars each designated by the numeral 36 is provided for holding pipe 21 in position at each end. With the opposite ends of pipe 21 supported on bearing surfaces 35, collars 36 are fastened in position over opposite ends of pipe 21 in any suitable manner to hold such pipe firmly in position so as to prevent rotation thereof during subsequent straightening thereof.

Pipe 21 is supported on apparatus 20 so that its bow 22 is accessible and in this example of the invention bow 22 is positioned so that it is concave upwardly.

Deforming means such as peening means shown as peening hammer means 140 is provided for peening pipe 21 in path means adjacent the line of maximum concave curvature of bow 22 to cause a change in the structure of pipe 21 along such path means which creates compressive fiber stresses in pipe 21 which straighten the upwardly concave bow 22. The peening hammer means or peening hammer 40 has a peening head shown at 41 which is substantially blunt and which is adapted to be repeatedly and forcefully driven against pipe 21 in the above mentioned path means to thereby set up and accumulate the above mentioned straightening forces.

Figure 4:
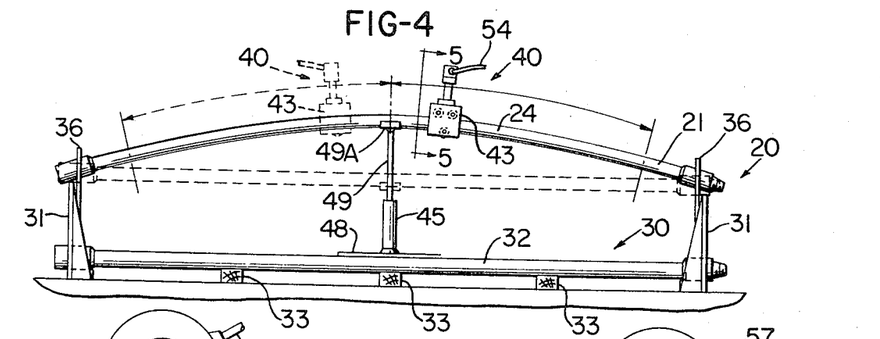
FIGURE 4 is a side elevation similar to FIGURE 2 showing the manner of moving a movable carriage carrying peening means along the pipe to be straightened.
Figure 5:
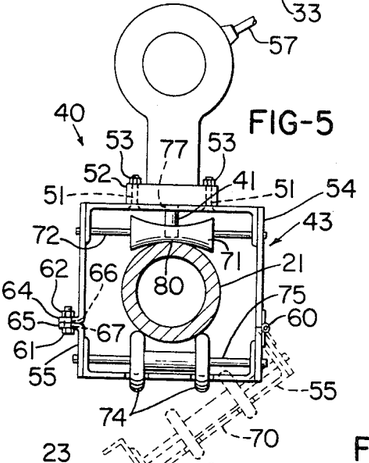
FIGURE 5 is an enlarged view on the line 5—5 of FIGURE 4.

Peening hammer 40 in the exemplary embodiment of this invention illustrated in FIGURES 4 and 5 is carried on carriage means shown as a carriage 43 and carriage 43 is supported by pipe 21 for movement therealong. As carriage 43 is moved along pipe 21 peening hammer 40 is actuated so that peening head 41 is repeatedly and forcefully driven against pipe 21 to provide peening path means along the top circumference of such pipe. Carriage 43 may be moved along pipe 21 in one or more passes over the full length of bow 22 so that hammer 40 may peen such pipe sufficiently to straighten bow 22.

As seen in FIGURES 1, 2 and 4 of the drawings, apparatus 20 further comprises bending means shown as a hydraulic jack 45 which is used for reverse bowing and temporarily holding pipe 21 from the position illustrated by the lower dotted line position shown at 46 in FIGURE 2 to the upper dotted line position shown at 47. Hydraulic jack 45 has a wide supporting base 48 which enables it to be moved to any position along base 30 of apparatus 20 and a vertically telescoping rod end 49 having a cradle-like member 49A provided at its terminal end for applying bending forces against pipe 21.

Jack 45 is preferably arranged so that its member 49A engages pipe 21 at its point of maximum downwardly convex curvature, i.e., with bow 22 arranged in an upwardly concave manner. Pipe 21 is then preferably first bent from the upwardly concave configuration shown by dotted lines in FIGURE 2 to a horizontal position shown by solid lines in such figure and then to a downwardly concave configuration, i.e., upwardly convex curvature, as illustrated by upper dotted line position 47.

Pipe 21 is bowed and held by jack 45 to define such upwardly convex curvature wtihin its elastic limit to assure that such pipe does not take a permanent set. With the pipe held in the convex curvature indicated at 47 in FIGURE 2 peening hammer 40 is then moved along the central portion of pipe 21 (i.e., along bow 22) and its peening head 41 peens such pipe to create compressive fiber stresses in the upper portion of pipe 21 which tend to counteract bowing forces and to straighten such pipe once hydraulic jack 45 is returned to its lowered position and the peening operation is completed.

In the illustration of FIGURE 4 of the drawings, carriage 43 is moved along pipe 21 to peen the right side thereof and carriage 43 is shown in solid lines. The carriage 43 is then moved to the left of vertical jack 45, as shown by dotted lines, to peen the left side of pipe 21. Means is provided for simply and readily fastening and unfastening carriage 43 along pipe 21 one each side of hydraulic jack 45 as will be described in detail subsequently.

Peening hammer 40 is attached to carriage 43 in any suitable manner and in this example of the invention a plurality of bolts each designated by the numeral 51 extend through suitable openings in a flange 52 comprising the lower portion of hammer 40 and through cooperating aligned openings in the upper portion of carriage 43. Each bolt 51 has an associated cooperating nut 53 which is threaded on its upper terminal end after each bolt 51 is extended through flange 52 and the associated upper portion of carriage 43.

In this example of the invention the peening hammer means is shown as a pneumatic hammer 40 and such pneumatic hammer is provided with a suitable source of compressed air through a compressed air line indicated at 57. The compressed air provided through line 57 is regulated to a commonly used operating pressure such as 90 lbs. per square inch, for example, which is typical of the pressure available from portable air compressors or from air compressors on the drilling rig and of the type available or used at a well drilling site.

Carriage 43 comprises a pair of substantially U-shaped structures designated by the numerals 54 and 55 respectively for the upper and lower U-shaped structure. U-shaped structures 54 and 55 are detachably fastened together using suitable fastening means and so that the terminal ends of their parallel leg portions adjoin each other and define a substantially tubular construction which, in this example of the invention, is approximately rectangular in peripheral outline.

The fastening means for fastening U-shaped structures 54 and 55 together to define substantially rectangular carriage 43 comprises hinge means shown as a hinge 60 fastened between the terminal end portions of one adjoining pair of the parallel leg portions of structures 54 and 55 and detachable means shown as a bolt 61 and cooperating nut 62 for fastening together adjoining flange portions 64 and 65 defining the terminal end portions of the opposite adjoining pair of parallel leg portions of U-shaped structures 54 and 55 respectively. Bolt 61 extends through aligned openings 66 and 67 provided in flanges 64 and 65 respectively.

Upon removing nut 62 and bolt 61 U-shaped structures 54 and 55 are easily moved in a hinged manner about hinge 60 allowing U-shaped portions 55 to drop to the dotted line position illustrated at 70 in FIGURE 5 of the drawings. Thus, it is a simple matter to clamp U-shaped portions 54 and 55 around elongated tubular pipe 21 and then securely fasten nut 62 in position on associated bolt 61. The simplicity with which carriage 43 may be fastened and unfastened enables it to be readily positioned on the pipe, removed from the pipe, or moved to opposite sides of the jack 45.

Means is provided for supporting carriage 43 for easy movement along pipe 21 and comprises oppositely arranged roller means suitably fixed for rotation about parallel spaced apart axes on carriage 43. In this example of the invention, pipe 21 to be straightened provides the sole support for carriage 43.

Carriage 43 has first roller means preferably comprised of a pair of identical rotatable rollers 71 each being rotatably mounted on an associated shaft 72 supported on upper U-shaped structure 54. In a similar manner, second roller means shown as a second spool-like roller 74 is provided and rotatably mounted on a shaft 75 supported for rotation on lower U-shaped structure 55. As seen particularly in FIGURE 5 of the drawings, rollers 71 are arranged above pipe 21 and roller 74 is arranged below such pipe and rollers 71 and 74 are arranged with their axes in parallel relation and are suitably supported for rotation so that elongated tubular pipe 21, of circular cross-sectional outline in this example of the invention, is firmly engaged therebetween.

Pneumatic hammer 40 with its peening head 41 is fixed on carriage 43 as previously explained and so that its peening head extends through suitable opening means shown at 77 in upper portion 54 of carriage 43 adjacent to and substantially normal to the axis of rollers 71. The arrangement of hammer 40 with respect to rollers 71 and 74 is such that its peening head 41 is forcefully driven against elongated pipe 21 and directed generally toward the oppositely arranged spool-like roller 74.

The preferred manner of straightening an elongated 30 foot section of 4½ inch diameter aluminum drill pipe 21, for example, is to place such pipe in apparatus 20 as illustrated in FIGURE 1 of the drawings and so that bow 22 is easily accessible and indexed in an upwardly concave manner. Pipe 21 is then raised using hydraulic jack 45 so that its bow is essentially eliminated and the pipe is moved in a straight line or solid line position as shown in FIGURE 2. Pipe 21 is then bowed to the uppermost dotted line position shown at 47 in FIGURE 2 in accordance with the reverse arching deflection curve shown in FIGURE 3 to assure that such pipe is not reverse arched beyond its elastic limit which would cause it to take an undesirable permanent set.

With pipe 21 moved to the dotted line position illustrated at 47 in FIGURE 2 (shown as the solid line position in FIGURE 4), carriage 43 is clamped in position around pipe 21. Carriage 43 is then moved along the central bowed portion of pipe 21 while actuating pneumatic hammer 40 causing its head 41 to be impacted forcefully against the top portion of pipe 21 to define peening path means designated by the numeral 80 in FIGURE 5 of the drawings.

Peening path 80 may be formed by one pass of pneumatic hammer 40 along the bowed portion of pipe 21 or it may be formed by a plurality of overlaid passes. As previously mentioned, the result of peening pipe 21 along path means 80 is to create forces within pipe 21 which nullify the bowing forces and thereby remove the bow causing pipe 21 to move from the lower dotted line position 46 in FIGURE 2 to the solid line position shown in such figure.

Figure 7:
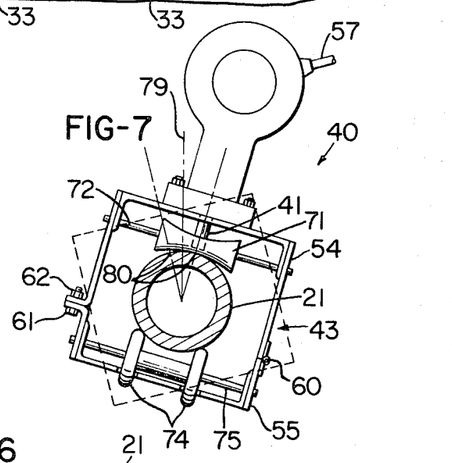
FIGURE 7 is a view similar to FIGURE 5 and showing the manner in which the carriage means of FIGURE 5 is rotated 15 degrees on each side of a vertical axis to provide a plurality of three peening passes along the tubular pipe to be straightened.

It has been found that in some straightening operations it is desirable to peen the elongated member in a plurality of parallel spaced apart paths which define peening path means 80. FIGURE 7 illustrates carriage 43 rotated about the longitudinal axis of pipe 21 preferably to either side of a vertical plane, shown at 79, and extending through the line of maximum upwardly concave curvature of bow 22. In this example carriage 43 is rotated 15 degrees on each side of vertical plane 79 to provide a peening pass also designated by the numeral 80 at each 15 degree location.

Figure 8:
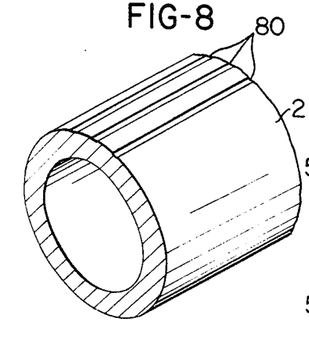
FIGURE 8 is an enlarged perspective view with parts in section and parts broken away of the central portion of a pipe as straightened after a plurality of three angularly displaced peening passes made as shown in FIGURE 7 and particularly showing the manner in which such peening passes define a plurality of three flats along the outer surface of such pipe.

Pipe 21 may be peened in a plurality of overlaid passes over the same path or a plurality of parallel spaced apart passes defining parallel spaced apart peening paths and each parallel path may be peened in a number of passes if desired. FIGURE 8 illustrates the three peening paths mentioned above in enlarged perspective view and shows the manner in which the outer periphery of the tubular pipe 21 becomes slightly flattened by the impact of blunt nosed hammer 41 thereagainst. Thus, as shown in FIGURES 7 and 8, a plurality of three parallel spaced apart peening passes may be provided in pipe 21 and such three passes cooperate to set up forces within pipe 21 to more effectively eliminate the upwardly concave bow 22 in pipe 21.

Blunt nosed head 41 of this example may be constructed to peen pipe 21 in a comparatively wide or narrow path as desired and in accordance with the outside diameter of pipe 21. Peening paths of a small fraction of an inch in width (i.e., less than ½ inch for a 4½ inches O.D. pipe) have been most effective and the preferred width of each peening path is about $\frac{1}{16}$ to $\frac{1}{8}$ of an inch.

In the example of this invention illustrated in FIGURES 1, 2 and 4 of the drawings, the preferred method of peening is illustrated in which apparatus 20 utilizes hydraulic jack 45 at a centrally arranged location to reverse bend or arch the upwardly concave bow 22 and provide an upwardly convex curvature along which carriage 43 is moved so that hammer 40 may be used to peen the top of the convex curvature of pipe 21. This technique provides a very rapid and effective straightening of pipe 21. However, it will be appreciated that an effective straightening of pipe 21 can be achieved without reverse arching and this technique is illustrated in FIGURES 9 and 10 of the drawings.

Figure 9:
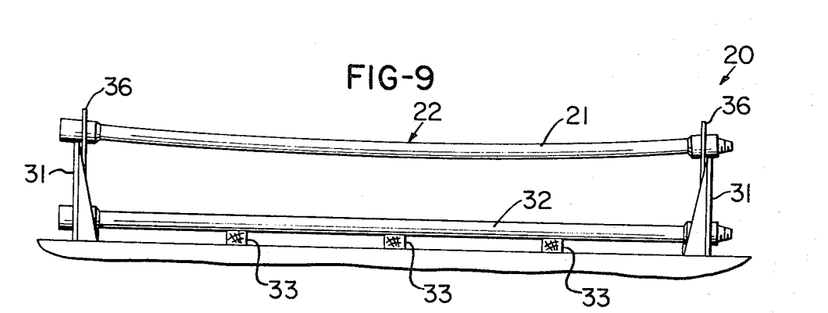
FIGURE 9 is a side elevation wherein the improved apparatus of FIGURE 1 is shown without central reverse bending means provided therein and showing a pipe arranged thereon so that it bows in an upwardly concave manner.

As seen in FIGURE 9 of the drawings, pipe 21 is installed on apparatus 20 with hydraulic jack 45 removed and so that bow 22 is arranged in an upwardly concave manner. Carriage 43 is then placed on pipe 21 as shown in FIGURE 10 of the drawings and moved along pipe 21 to enable hammer 40 to peen pipe 21 along the central bowed portion thereof in path means which may be comprised of a single peening path comprised of a plurality of passes as previously explained. However, pipe 21 as supported in FIGURE 10 may be peened in path means comprised of a plurality of spaced apart peening path means similar to the three path means illustrated in FIGURE 8 of the drawings. The peening of pipe 21 as shown in FIGURE 10 along its upwardly concave bow 22 sets up forces therealong within such pipe, as previously described, to provide an effective straightening action. Straightening by this latter technique is very effective, however, it is not as fast as the previous technique employing reverse arching.

Figure 10:
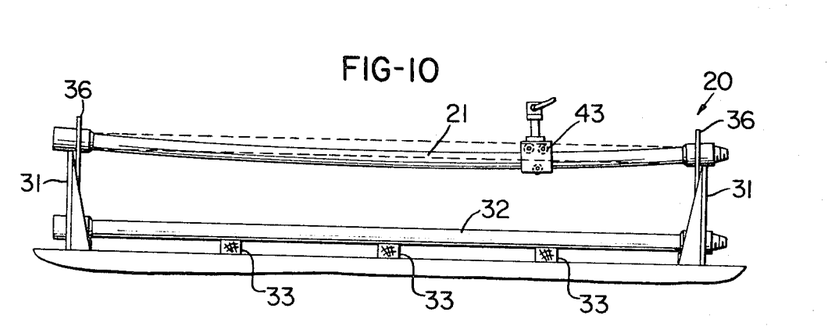
FIGURE 10 illustrates carriage means and peening means similar to the carriage means and peening means shown in FIGURE 4 installed in position on the upwardly concave pipe of FIGURE 9 to peen and straighten such pipe from the solid line configuration to the essentially horizontal configuration shown by dotted lines.

With the exception of hydraulic jack 45 which has been eliminated, the apparatus shown in FIGURES 9 and 10 is identical to apparatus 20 which was previously described in detail; therefore, it is not considered necessary to repeat the previous description of such apparatus.

Thus, it is seen that irrespective of whether pipe 21 is reverse arched or allowed to remain in its upwardly concave configuration on apparatus 20, the peening of narrow path means adjacent the full length of the bow means 22 to be straightened causes changes in the structure of the pipe along the peening path means which create forces which offset the bowing forces thereby eliminating the bow in the pipe 21.

Figures 11, 12:
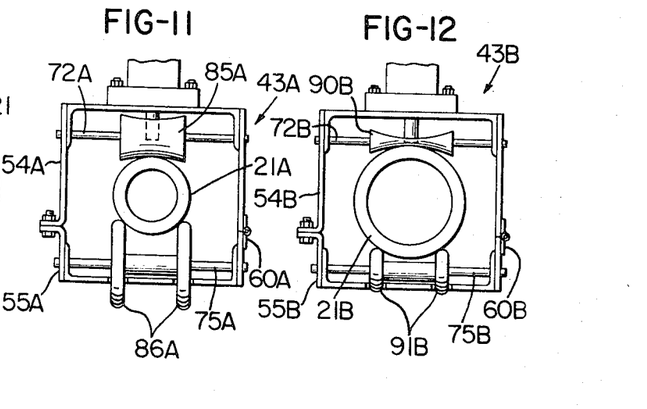
FIGURE 11 is a view similar to FIGURE 5 of the drawings showing carriage means similar to the carriage means shown in FIGURE 5 and having comparatively large removable roller means to enable easy straightening of a pipe smaller in outside diameter than the pipe of FIGURES 2 and 4.
FIGURE 12 is a view similar to FIGURE 11 showing carriage means similar to the carriage means of FIGURE 5 and having comparatively small removable roller means to enable easy straightening of a pipe larger in outside diameter than the pipe of FIGURES 2 and 4.

Another exemplary embodiment of the carriage of this invention is illustrated in FIGURE 11 of the drawings. The carriage of FIGURE 11 is identical to carriage 43 and is useable in apparatus 20 irrespective of whether hydraulic jack 45 is utilized or not; therefore, such carriage will be designated generally by the numeral 43A and parts of carriage 43A which are identical to corresponding parts of carriage 43 will be designated by the same numeral as carriage 43 also followed by the letter designation A and not described again. Only those component parts which are different from corresponding parts in carriage 43 will be designated by a new numeral also followed by the letter designation A and described in detail.

The only difference in carriage 43A and carriage 43 is in the provision of a pair of comparatively large identical roller means or rollers 85A in the upper end portion thereof larger than roller 71 and a larger spool-like roller 86A provided at the lower portion thereof larger than roller 74. Rollers 85A and 86A are adapted to engage the outer circumference of a pipe 21A which is similar to pipe 21 yet is smaller in outside diameter than pipe 21. The operation of carriage 43A and its associated component members is identical to the operation of carriage 43 and hence will not be repeated.

FIGURE 12 of the drawings illustrates another exemplary embodiment of the carriage 43 of this invention. The carriage illustrated in FIGURE 12 is practically identical to carriage 43; therefore, in a similar manner as before, such carriage will be designated generally by the numeral 43B and parts thereof which are identical to corresponding parts of carriage 43 will be designated by the same numeral as previously also followed by the letter designation B and not described again. Only those component parts which are different from corresponding parts in carriage 43 will be designated by a new numeral also followed by the letter designation B and described in detail.

The only difference between carriage 43B and carriage 43 is that carriage 43B is adapted to be placed around a tubular pipe 21B which is comparatively larger in outside diameter than pipe 21. Accordingly, a pair of identical small top rollers 90B are provided for engaging the upper portion of pipe 21B and a cooperating comparatively small spool-like roller 91B is provided for engaging the lower portion of pipe 21B.

Thus, it is seen that carriages 43A and 43B are adapted to be used with respective pipes which are smaller than and larger than pipe 21. It will be appreciated that by changing the size rollers within carriage 43, the basic carriage construction may be used with many different size pipes.

Figure 13:
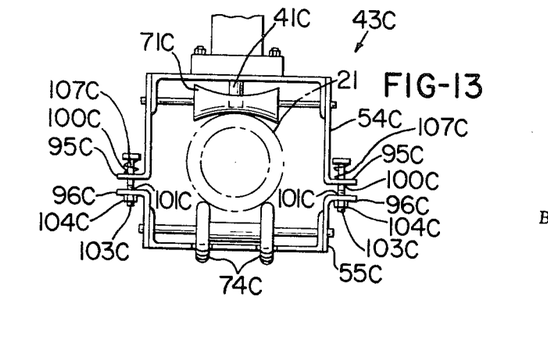
FIGURE 13 illustrates another embodiment of carriage means similar to the carriage means of FIGURE 5 and which utilizes yieldable urging means to hold a pair of substantially U-shaped structural members comprising such carriage means against opposite sides of the tubular pipe shown by dotted lines wherein the carriage means of this latter embodiment is easily usable on pipes having different outside diameters.

FIGURE 13 illustrates another exemplary embodiment of the carriage 43 of this invention. The carriage illustrated in FIGURE 13 is practically identical to carriage 43; therefore, in a similar manner as before, such carriage will be designated generally by the numeral 43C and parts thereof which are identical to corresponding parts of carriage 43 will be designated by the same numeral as previously also followed by the letter designation C and not described again. Only those component parts which are different from corresponding parts in carriage 43 will be designated by a new numeral also followed by the letter designation C and described in detail.

Carriage 43C does not have hinge means provided therein and utilizes detachable nut and bolt means to hold together its U-shaped sections 54C and 55C as will be presently described. U-shaped portion 54C has a pair of flanges each designated by the numeral 95C extending outwardly in opposite directions from the terminal ends of its parallel leg portions. Similarly, U-shaped portion 55C has a pair of flanges 96C extending outwardly in opposite directions from the terminal ends of its parallel leg portions.

Each flange 95C and 96C has an opening 100C and 101C respectively provided therethrough and U-shaped portions 54C and 55C are adapted to be placed together as shown in FIGURE 13 with openings 100C and 101C in aligned relation at each side of carrier 43C. A pair of bolts each designated by the numeral 103C and associated cooperating nuts each designated by the numeral 104C is provided for holding U-shaped portions 54C and 55C together. Each bolt 103C extends through a set of associated openings 100C and 101C at each side of carriage 43C and a nut 104C is then threaded into attaching engagement.

The carriers 43A and 43B utilized different size rollers to accomodate different size pipes to be straightened; however, carrier 43C has yieldable urging means comprised of a pair of compression springs 107C for urging and holding rollers 71C and 74C against pipe 21. Thus, upon placing carrier 43C about a pipe having a different diameter than pipe 21 springs 107C yield to accomodate the different size while still holding carrier 43C with its hammer 40C in the proper manner. Springs 107C also help provide a sort of rebounding peening action.

FIGURES 14–17 illustrate another exemplary embodiment of improved carriage means of this invention which is similar to carriage 43; therefore, in a similar manner as before, such carriage will be designated generally by the numeral 43D. Also, component parts of carriage 43D will be designated by a new numeral also followed by the letter designation D and described in detail.

Figure 14:
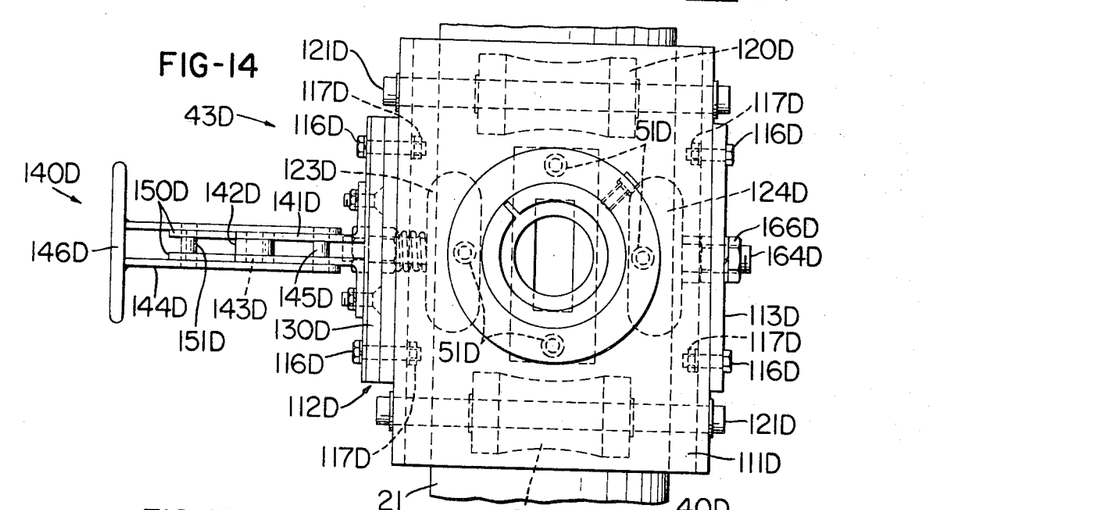
FIGURE 14 is a top plan view of another embodiment of carriage means of this invention.

Carriage 43D comprises a substantially U-shaped structure designated generally by the numeral 110D which has a transverse leg portion 111D and a pair of outwardly extending legs 112D and 113D which extend outwardly from transverse leg portion 111D. In this exemplary application of the invention carriage 43D is installed in position on a pipe 21 to be straightened with leg portion 111D arranged substantially horizontally and with outwardly extending legs 112D and 113D arranged to extend downwardly from horizontal transverse leg portion 111D in approximately parallel relation.

Transverse leg portion 111D is preferably formed from a U-shaped channel and outwardly extending legs 112D and 113D are suitably fastened to channel 111D in a fixed manner and using any suitable fastening means. A plurality of bolts each designated by the numeral 116D and associated nuts each designated by the numeral 117D are utilized to fasten outwardly extending legs 112D and 113D to transverse leg portion 111D to define the substantially U-shaped structure 110D of carriage 43D.

Carriage 43D has deforming means such as a peening hammer 40D suitably attached thereto by a plurality of threaded bolts 51D. Each bolt 51D extends through an associated opening 118D in transverse leg portion 111D and an associated cooperating threaded opening 119D in the lower portion of hammer 40D.

Carriage 43D has first roller means shown as a pair of rollers each designated by the numeral 120D which are rotatably mounted on U-shaped structure 110D preferably adjacent transverse leg portion 111D. Each roller 120D is carried on an associated shaft 121D and in this example of the invention shafts 121D are arranged in parallel spaced apart relation and substantially parallel to transverse leg portion 111D of U-shaped structure 110D. The opposite ends of each shaft 121D are supported on U-shaped structure 110D in any suitable manner.

Figure 15:
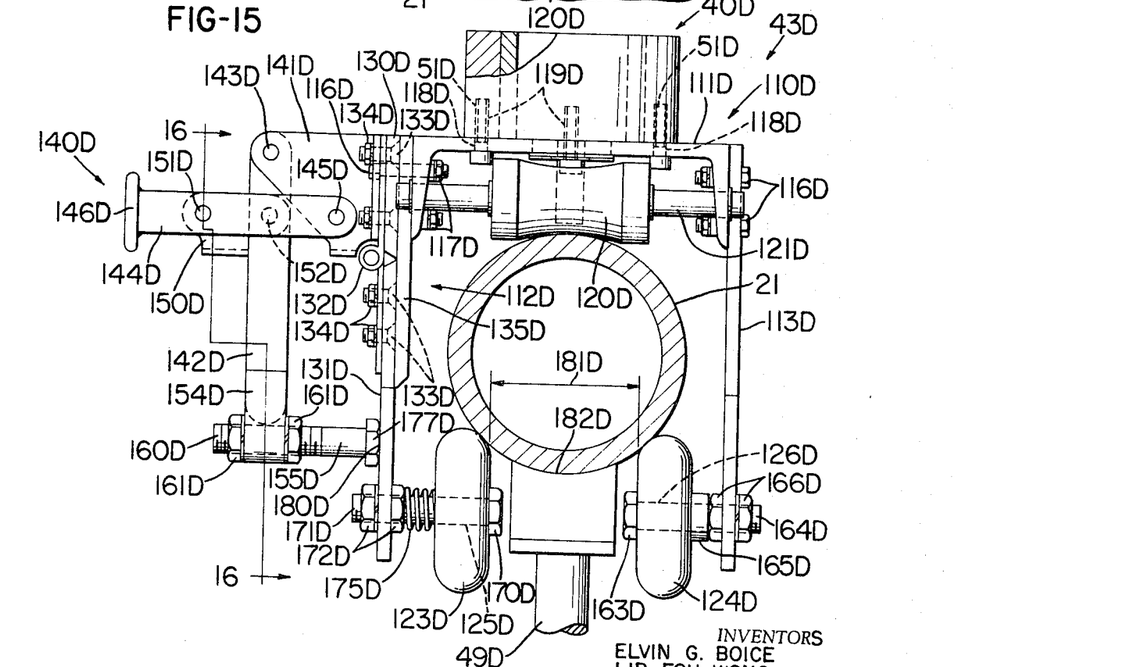
FIGURE 15 is a front elevation of the carriage means of FIGURE 14.

Carriage 43D also has second roller means mounted on the outwardly extending leg portions 112D and 113D of U-shaped structure 110D. In this example of the invention the second roller means comprises a pair of rollers designated by the numerals 123D and 124D. Each roller 123D and 124D is rotatably carried on an associated shaft which extends inwardly toward the central portion of the substantially U-shaped structure 110D, whereby rollers 123D and 124D are essentially carried in a cantilevered manner.

Each roller 123D and 124D is carried on its associated shaft means and in this example roller 123D is carried on a first shaft 125D extending inwardly from one of the outwardly extending legs which in this example is leg 112D. The other roller 124D is carried on a shaft 126D which is supported on the other leg 113D of U-shaped structure 110D.

Leg 112D is comprised of a fixed inner end portion designated by the numeral 130D and a movable outer end portion designated by the numeral 131D. Outer end portion 131D is preferably fastened to inner end portion 130D in a hinged manner and utilizing hinge means designated by the numeral 132D.

Hinge 132D is fastened to end portions 130D and 131D in any suitable manner and this example a plurality of bolts each designated by the numeral 133D and associated cooperating nuts 134D are utilized to thereby fasten outer end portion 131D to inner or fixed end portion 130D of leg 112D. Thus, it is seen that outer end portion 131D of leg 112D carrying roller 123D is adapted to be moved in a hinged manner about hinge 132D toward and away from the opposite leg 113D and hence toward and away from an associated pipe 21 which is to be straightened.

Carriage 43D has stop means for limiting the movement of outer end portion 131D as it is moved inwardly toward leg 113D. In this example, the stop means comprises a vertically extending plate 135D which is suitably fastened in position by sandwiching such plate between inner end portion 130D of leg 112D and a downwardly extending flange portion of the channel defining transverse leg portion 111D. Plate 135D is suitably held in position utilizing a plurality of nuts 117D and associated bolts also designated by the numeral 116D and which are slightly longer than the bolts 116D holding leg portion 113D in position.

Figures 16, 17:
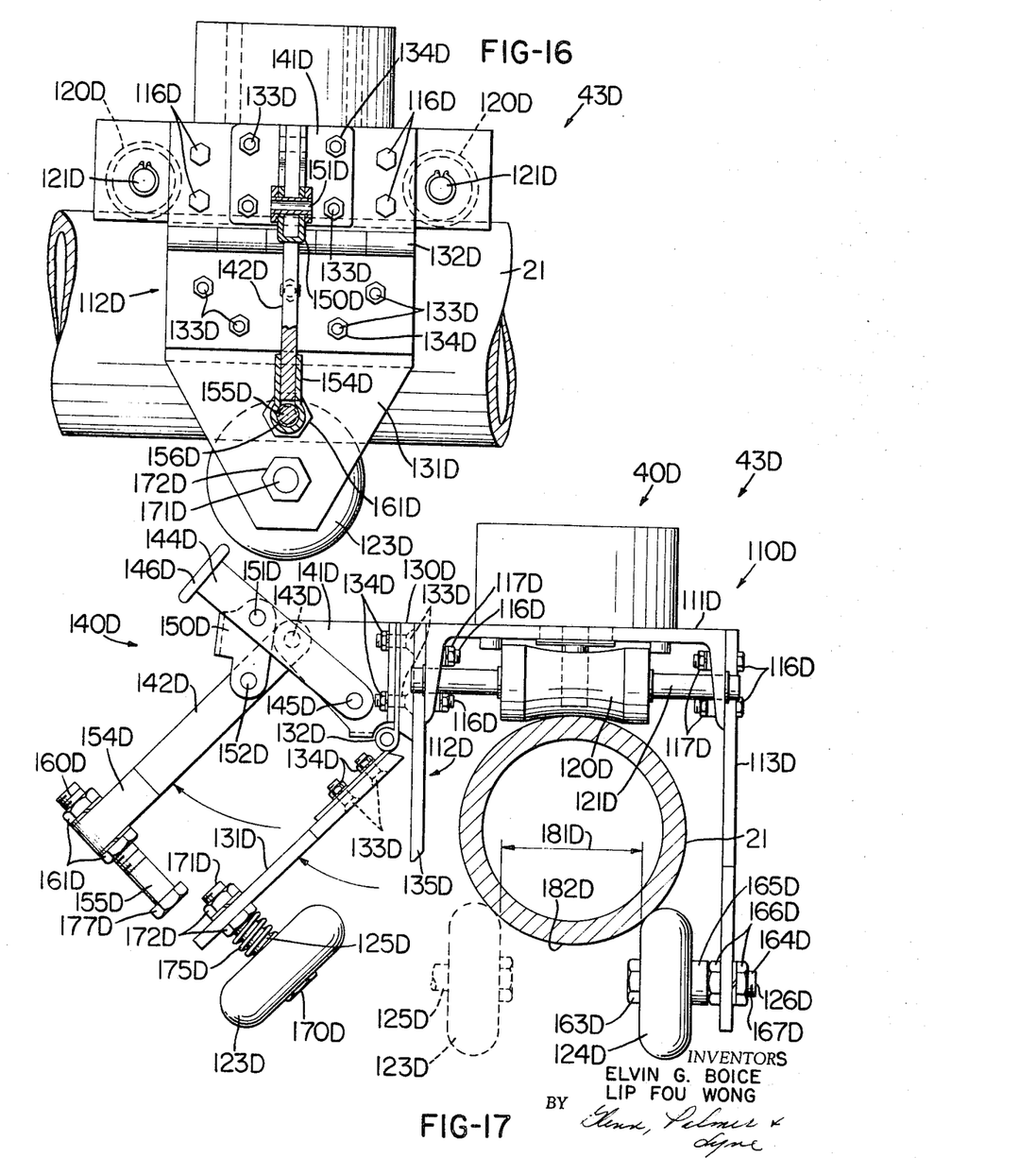
FIGURE 16 is a view taken on the line 16—16 of FIGURE 15.
FIGURE 17 is a front elevation similar to FIGURE 15 particularly illustrating the operation of the structure which enables the carriage to be easily installed and clamped on an associated pipe.

As seen particularly in FIGURE 17 of the drawings, hinge 132D allows the outer end portion 131D of leg 112D to be swung about such hinge toward and away from an associated pipe 21 which is to be straightened. This enables carriage 43D to be easily installed in position on such pipe 21 by swinging leg portion 131D outwardly to the solid line position of FIGURE 17. Once carriage 43D is installed in position, outer end portion 131D is moved so that its roller 123D is moved from its solid line position to the dotted line position and into engagement with lower surface means of pipe 21.

Stop 135D is fixed in position so that upon moving leg portion 131D thereagainst it is positioned in a plane substantially common with the plane of inner end portion 130D. Further, as seen in FIGURE 15, with outer end portion 131D positioned against stop 135D legs 112D and 113D are arranged substantially in parallel relation.

Carriage 43D has clamping means for clamping hinged end portion 131D of leg 112D against stop 135D. Any suitable clamping means may be utilized; however, in this example of the invention a toggle clamp designated generally by the numeral 140D is used. Toggle clamp 140D is suitably mounted on a bracket 141D which is fixed to inner leg portion 130D by a plurality of bolts 133D and cooperating nuts 134D.

Toggle clamp 140D has a downwardly extending link 142D which is pivotally mounted about a pivot pin 143D which is suitably supported on bracket 141D. Toggle clamp 140D also has a horizontally extending link 144D which is also mounted on bracket 141D for pivoting movement on a pivot pin 145D. Link 144D has an outer substantially T-shaped handle portion 146D which enables it to be easily grasped to move toggle clamp 140D into and out of clamping engagement.

Toggle clamp 140D has a drag link 150D which has its outer end portion suitably fastened by a pin 151D to horizontally extending leg 144D. The inner end portion of drag link 150D is suitably fastened by a pin 152D to vertically extending link 142D. Upon grasping handle 146D and pulling upwardly as viewed in FIGURES 15 and 17 of the drawings, drag link 150D enables link 142D to be moved rapidly away from its position against stop 135D.

Vertically extending link 142D has a substantially U-shaped member 154D suitably fastened to its terminal lower end. Member 154D is adapted to support suitable means for engaging the hinged end portion 131D of leg 112D and in this example a bolt 155D is supported by member 154D for this purpose. Bolt 155D extends through a cooperating opening 156D which is defined in the terminal end of U-shaped member 154D.

With toggle clamp 140D in its clamped position bolt 155D extends substantially horizontally and into engagement with swinging end portion 131D of leg 112D. The construction of the toggle clamp 140D is such that any forces exerted against bolt 155D by acting through swinging end portion 131D will not open or release the toggle clamp and this operating feature is a characteristic of toggle clamps in general.

Bolt 155D may be adjustably positioned with respect to link 142D and this is made possible by providing threads designated by the numeral 160D at the terminal end of bolt 155D. A pair of cooperating nuts each designated by the numeral 161D are adapted to be threaded onto threaded portion 160D of bolt 155D on opposite sides of link 142D. Threads 160D and nuts 161D enable bolt 155D to be axially moved so as to assure firm clamping of end portion 131D against stop 135D and to assure that toggle clamp 140D remains in its locked position with handle 146D in the horizontal position illustrated in FIGURE 15.

As previously mentioned each roller 123D and 124D is mounted on its associated leg portion 112D and 113D respectively in a cantilevered manner. Roller 124D is mounted on shaft 126D which comprises essentially a bolt-type shaft which has a bolt head 163D and a threaded end portion 164D. Roller 124D has one of its side surfaces carried essentially against bolt head portion 163D. Its opposite end portion is spaced away from leg 113D by bushing means shown as a bushing 165D and the shaft 126D extends through an opening in leg 113D adjacent its terminal end and is fastened to leg 113D by a pair of suitable cooperating nuts each designated by the numeral 166D and threaded on threads 167D at the terminal end of bolt 126D.

In a similar manner, shaft 125D supporting roller 123D is a bolt-like shaft means having a bolt head 170D and a threaded portion 171D which is adapted to be extended through an associated opening in terminal end portion 131D of leg 112D. With threaded portion 171D extending through such opening a pair of threaded nuts each designated by the numeral 172D and arranged on opposite sides of leg portion 131D hold shaft 125D firmly in position.

However, roller 123D of this example is urged away from leg portion 131D by suitable urging means and with such leg in its normal position it will be seen that roller 123D is urged toward and against pipe 21. Such urging means comprises a compression spring 175D which acts between inside surface means of leg 112D and an associated surface of roller 123D. Spring 175D enables carriage 43D to be installed in position about a pipe 21 and upon actuating toggle clamp 140D, leg portion 131D is swung into position as illustrated by dotted lines in FIGURE 17 and roller 123D is yieldingly urged against pipe 21.

The yielding urging action created by spring 175D pushing against roller 123D not only causes a yielding urging action at the point of engagement of roller 123D with the associated portion of pipe 21 but it also creates a yielding engagement at the point of contact of rollers 124D and 120D against their associated portions of pipe. Thus, all of the rollers are yieldingly held against elongated pipe 21 and thereby enable a more positive movement in a substantially rectilinear manner along pipe 21 to enable the deforming means or peening hammer to be forcefully driven to remove the bow in pipe 21.

The construction and arrangement of carriage 43D is particularly useful in allowing such carriage to be easily installed in position on a pipe 21, see FIGURE 17. It is a simple matter to loosen toggle clamp 140D and allow leg portion 131D to swing outwardly to enable carriage 43D to be installed in position on the pipe 21. Toggle clamp 140D is then actuated closed causing the terminal end portion 177D of bolt 155D to engage an associated portion of 180D of leg portion 131D to thereby hold outer end portion 131D firmly against its stop 135D and roller 123D firmly against pipe 21.

As seen particularly in FIGURES 15 and 17 of the drawings, rollers 123D and 124D are supported in a cantilevered manner essentially about a common axis and arranged in a spaced apart manner with a comparatively large space shown at 181D therebetween. With space 181D between rollers 123D and 124D it is possible to move carriage 43D in a continuous uninterrupted manner across an associated pipe 21 to be straightened under conditions where such pipe has bending means which engage lower surface means of the pipe at a location designated by the numeral 182D and used to reverse arch the particular pipe to provide a more efficient action of the deforming means of this invention and as previously described. To highlight the construction of carriage 43D which enables such continuous uninterrupted movement across a pipe 21 with such pipe in a reverse bowed or arched condition, the upper end portion of a hydraulic jack 49D, or the like, is shown engaging pipe 21 in FIGURE 15 wherein it is seen that such jack does not obstruct the free movement of carriage 43D.

Thus, carriage 43D may be traversed the full length of pipe 21 including over the bending means or jack 49D without having to stop and move the carriage 43D from one side of the jack to the other as was required in using other previously described carriage means. This feature enables carriage 43D to move peening hammer 40D in a continuous and uninterrupted manner across pipe 21 to be straightened and thereby provide a more efficient peening along such pipe in the manner previously described.

The use of urging means or compression spring 175D not only enables carriage 43D to be held in a yielding manner against an associated pipe 21 of a given size (i.e. outside peripheral outline) but within a predetermined range of pipe sizes the compression spring 175D also compensates for pipes of different sizes, i.e., different cross-sectional peripheral outlines. Therefore, within such predetermined range of pipe sizes it is possible to use carriage 43D to provide an efficient straightening action.

Spring 175D is shown being used with a movable leg portion 131D of U-shaped structure 110D; however, it will be appreciated that such spring could be used in association with leg portion 113D and roller 124D instead of with roller 123D. Also, if desired, a spring similar to spring 175D may be used with each roller 123D and 124D.

Thus, it is seen that carriage 43D illustrated in FIGURES 14-17 of the drawings, provides an improved construction which has advantages distinct from the previously described embodiments and when used in association with the apparatus and method of this invention enables the removal of bow means in elongated pipe in an efficient and economical manner.

Although in this disclosure of the invention the deforming means is shown as a pneumatic hammer which has a blunt pneumatic peening head, it will be appreciated that such deforming means may be any suitable peening hammer or any other suitable deforming means which may be driven pneumatically, mechanically, electrically, hydraulically, or any combination of these driving means.

Figure 3:
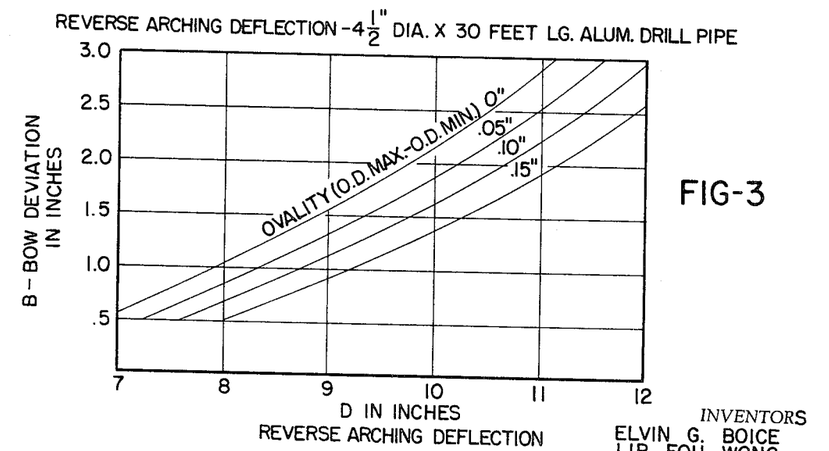
FIGURE 3 presents a typical graph showing the amount of reverse arching deflection or the amount of reverse convex curvature which is allowable within the elastic limit of any exemplary section of aluminum drill pipe of the size shown to enable a more efficient straightening operation.

The curve presented in FIGURE 3 of the drawings is shown as being applicable to a 30 ft. length of aluminum pipe having an outside diameter of 4½ inches and being constructed essentially as shown in FIGURE 6 of the drawings. The amount of reverse arching or reverse bending deflection is given for various pipe ovalties (i.e., the difference between the maximum outside diameter of pipe 21 and minimum outside diameter of such pipe) and it will be appreciated that if the reverse deflection presented is exceeded the pipe will be overstressed beyond its elastic limit and the technique presented herein will be ineffective. It will be appreciated that pipe made of steel or other metals and in various combinations will have reverse arching tables similar to the one presented herein for aluminum pipe and as an example.

The type member which is shown as being straightened in this disclosure of the invention comprises a tubular pipe having a circular cross section. However, it will be appreciated that any type member may be suitably straightened and that such member may be solid in cross section or have a cross section of practically any configuration.

Terms such as "upwardly," "downwardly," "upper," "lower," "inwardly," "outwardly," "ends," and the like, have been used in this disclosure of the invention merely to define the arrangement of the various elongated members as well as the components of the improved apparatus as illustrated in the drawings and such terms should not be considered as limiting the scope of this invention in any way.

Thus, it is seen that an improved portable apparatus has been provided for straightening an elongated member in an efficient and economical manner without damage to such member.

Further, this invention provides an improved method of straightening such elongated member which can be carried out by comparatively unskilled personnel.

While the form of the invention now preferred has been disclosed as required by statute, other forms may be used, all coming within the scope of the claimed subject matter which follows.

What is claimed is:

1. An apparatus for removing bow means in an elongated member comprising, supporting means for supporting said member so that its bow means is accessible, and deforming means for deforming by compressive forces the surface of said member in path means adjacent the line of maximum concave curvature of said bow means so as to cause a change in the structure of said member along said path means which creates compressive fiber stresses in said member which remove said bow means.

2. The apparatus as set forth in claim 1 in which said deforming means is adapted for deforming said member in a plurality of overlaid passes defining said path means.

3. The apparatus as set forth in claim 1 in which said deforming means is adapted for deforming said member in a plurality of parallel spaced apart passes defining said path means.

4. The apparatus as set forth in claim 1 in which said supporting means comprises a pair of supports for supporting said member adjacent opposite ends of said bow means, and further comprising bending means for reverse bowing and temporarily holding said member within its elastic limit so that said concave curvature is bowed and temporarily held to define a convex curvature and with said member thus held said deforming means is moved to deform said member adjacent its original line of maximum concave curvature to thereby provide a more efficient bow removing operation.

5. The apparatus as set forth in claim 4 further comprising, carriage means supported for movement along said elongated member, said carriage means comprising a substantially U-shaped structure having first roller means rotatably mounted adjacent its transverse leg portion and adapted to engage said member along one side thereof and second roller means mounted on the outwardly extending legs of said U-shaped structure and adapted to engage said member along the opposite side thereof, with said second roller means being mounted on said outwardly extending legs with a space therebetween, and attaching means for attaching said deforming means on said carriage means, whereby said bending means engages said opposite side of said member and temporarily holds it to define said convex curvature and said space between said second roller means enables movement of said carriage means the full length of said member including over said bending means to thereby provide said deforming in a continuous uninterrupted manner adjacent said original line of maximum concave curvature.

6. The apparatus as set forth in claim 1 in which said deforming means comprises hammer means having substantially blunt head means adapted to be repeatedly and forcefully driven against said member in said path means.

7. The apparatus as set forth in claim 6 further comprising, carriage means supported for movement along said elongated member, said carriage means comprising a substantially U-shaped structure having first roller means rotatably mounted adjacent its transverse leg portion and adapted to engage said member along one side thereof and second roller means mounted on the outwardly extending legs of said U-shaped structure and adapted to engage said member along the opposite side thereof, and attaching means for attaching said hammer means on said carriage means, whereby said carriage means enables said hammer means to be moved along said member to provide said deforming adjacent said line of maximum concave curvature.

8. The apparatus as set forth in claim 6 further comprising carriage means supported for movement along said member and attaching means for attaching said hammer means on said carriage means with said head means free to move toward and away from said member, whereby said carriage means enables said hammer means to be moved along said member to provide said deforming adjacent said line of maximum concave curvature.

9. The apparatus as set forth in claim 8 in which said carriage means is supported by said member for movement therealong and comprises first roller means engaging said member along one side thereof and second roller means engaging said member on the opposite side thereof at a location substantially diametrically opposite said first roller means, and hammer means is attached in a fixed manner adjacent said first roller means so that its head means is forcefully driven against said member and directed generally toward said second roller means.

10. The apparatus as set forth in claim 9 in which said carriage means comprises first and second substantially U-shaped structures and fastening means for detachably fastening said U-shaped structures together with the terminal end means of their parallel leg portions adjoining each other to define a substantially tubular construction, said first roller means being rotatably supported on said first U-shaped structure about a first axis and said second roller means being rotatably supported on said second U-shaped structure about a second axis parallel to said first axis, whereby said first and second structures are readily unfastened and placed around a bowed elongated member and then fastened together with said first and second roller means arranged on opposite sides of said elongated member to enable smooth movement of said carriage along said elongated member.

11. The apparatus as set forth in claim 10 in which said fastening means comprises hinge means for fastening together terminal end means of one adjoining pair of said parallel leg portions in a hinged manner, and detachable means for detachably fastening together the other adjoining pair of said parallel leg portions, whereby upon detaching said detachable means said U-shaped structures are hinged apart about said hinge means, readily clamped around said elongated member, and reattached to enable movement of said carriage along said elongated member to enable removal of said bow means.

12. The apparatus as set forth in claim 10 further comprising yieldable urging means cooperating with said fastening means and acting between said U-shaped structures to normally urge said structures together, said urging means and fastening means enabling easy attachment of said tubular structure around elongated members having different cross-sectional areas.

13. The apparatus as set forth in claim 12 in which said urging means comprises compression spring means.

14. The apparatus as set forth in claim 10 in which said hammer means comprises a pneumatic hammer having pneumatically driven peening head means which provides deforming path means along said elongated member generally of the order of a fraction of an inch in width.

15. An improved method of removing bow means in an elongated member comprising the steps of, providing an elongated member, providing supporting means for supporting said elongated member, supporting said member with said supporting means so that its bow means is accessible, providing deforming means, and deforming by compressive forces the surface of said member in path means adjacent the line of maximum concave curvature of said bow means so as to cause a change in the structure of said member along said path means which creates compressive fiber stresses in said member which remove said bow means.

16. The method as set forth in claim 15 in which said deforming step comprises deforming said elongated member in a plurality of overlaid passes defining said path means.

17. The method as set forth in claim 15 in which said deforming step comprises deforming said elongated member in a plurality of parallel spaced apart passes defining said path means.

18. The method as set forth in claim 15 in which, said step of providing supporting means comprises providing a pair of supports for supporting said elongated member, said supporting step comprises supporting said member adjacent opposite ends of said bow means, and comprising the further steps of, providing bending means, reverse bowing and temporarily holding said member within its elastic limit with said bending means so that said concave curvature is bowed to define a convex curvature, whereby said deforming step comprises deforming said member adjacent its original line of maximum concave curvature while it is temporarily held in its reverse bowed condition to provide a more efficient bow removing operation.

19. The method as set forth in claim 18 comprising the further steps of, providing carriage means comprising a substantially U-shaped structure having first roller means rotatably mounted adjacent its transverse leg portion and adapted to engage said member along one side thereof and second roller means mounted on the outwardly extending legs of said U-shaped structure and adapted to engage said member along the opposite side thereof, with said second roller means being mounted on said outwardly extending legs with a space therebetween, supporting said carriage means on said member with said roller means engaging opposite sides thereof, providing attaching means, and attaching said deforming means on said carriage means with said attaching means, whereby said bending means engages said opposite side of said member and temporarily holds it to define said convex curvature and said space between said second roller means enables movement of said carriage means the full length of said member including over said bending means to thereby provide said deforming during said deforming step in a continuous uninterrupted manner adjacent said original line of maximum concave curvature.

20. The method as set forth in claim 18 in which said step of providing an elongated member comprises providing an elongated metal pipe.

21. The method as set forth in claim 20 in which said step of providing deforming means comprises providing hammer means having substantially blunt head means adapted to be repeatedly and forcefully driven against said pipe in said path means.

22. The method as set forth in claim 21 comprising the further steps of, providing carriage means, supporting said carriage means for movement along said pipe, providing attaching means, attaching said hammer means on said carriage means with said attaching means so that said head means is free to move toward and away from said pipe, and said deforming step comprises moving said carriage means and hammer means along said pipe to provide said deforming adjacent said line of maximum concave curvature.

23. The method as set forth in claim 22 in which said step of providing carriage means comprises providing carriage means adapted to be supported by said pipe for movement therealong and having first roller means engaging said pipe along one side thereof and second roller means engaging said pipe on the opposite side thereof at a location substantially diametrically opposite said first roller means, and said attaching step comprises attaching said hammer means adjacent said first roller means to enable its head means to be forcefully driven against said pipe while being directed generally toward said second roller means.

24. The method as set forth in claim 23 in which said step of providing carriage means further comprises providing carriage means having first and second substantially U-shaped structures and having fastening means for detachably fastening said U-shaped structures together with the terminal end means of their parallel leg portions adjoining each other to define a substantially tubular construction, said first roller means being rotatably supported on said first U-shaped structure about a first axis and said second roller means being rotatably supported on said second U-shaped structure about a second axis parallel to said first axis, whereby said first and second structures are readily unfastened and placed around a bowed elongated pipe and then fastened together with said first and second roller means arranged on opposite sides of said pipe to enable removal of said bow means.

25. The method as set forth in claim 23 in which said step of providing carriage means comprises providing carriage means having a substantially U-shaped structure having said first roller means rotatably mounted adjacent its transverse leg portion and adapted to engage said pipe along said one side and said second roller means mounted on the outwardly extending legs of said U-shaped structure and adapted to engage said pipe along said opposite side.

26. The method as set forth in claim 24 comprising the further steps of providing yieldable urging means adapted to cooperate with said fastening means and placing said yieldable urging means between said U-shaped structures so as to normally urge said structures together, whereby said urging and fastening means enable easy attachment of said tubular structure defining said carriage around pipes of different sizes.

27. The method as set forth in claim 26 in which said step of providing urging means comprises providing compression spring means.

28. The method as set forth in claim 26 in which said step of providing hammer means comprises providing an air hammer having blunt peening head means which when moved along said pipe during said deforming step generally flattens the outer surface of said metal pipe to define path means generally of the order of a fraction of an inch.

29. Carriage means for carrying deforming means along an elongated member to enable removal of bow means in said elongated member said carriage means comprising, a substantially U-shaped structure, first roller means rotatably mounted on said U-shaped structure adjacent the transverse leg portion of said U-shaped structure and adapted to engage said member along one side thereof, and second roller means mounted on the outwardly extending legs of said U-shaped structure and adapted to engage said elongated member along the opposite side thereof, whereby said carriage means enables said deforming means to be moved in a continuous path along said elongated member.

30. Carriage means as set forth in claim 29 further comprising shaft means fastened to each of said outwardly extending legs, said shaft means extending inwardly toward a plane midway between said outwardly extending legs and each shaft means rotatably carrying an associated second roller means essentially in a cantilevered manner.

31. Carriage means as set forth in claim 30 in which said shaft means comprises first shaft means fastened to one of said outwardly extending legs and further comprising urging means acting along each associated first shaft means to yieldingly urge its associated second roller means outwardly toward the terminal end of said first shaft means into yielding engagement against said elongated member along said opposite side thereof.

32. Carriage means as set forth in claim 30 in which one of said outwardly extending legs is comprised of a fixed inner end portion and a movable outer end portion which is normally arranged substantially in a common plane with said inner end portion, and further comprising hinge means for fastening said outer end portion to said inner end portion for hinged movement about said hinge means, whereby said carriage means is easily placed on an associated elongated member by swinging said outer end portion about said hinge means and away from the other leg of said outwardly extending legs and after placing said carriage means on said elongated member said outer end portion is swung back into said common plane.

33. Carriage means as set forth in claim 32 further comprising clamping means for clamping said outer end portion in said common plane.

34. Carriage means as set forth in claim 32 further comprising stop means on said carriage means for limiting the movement of said outer end portion toward the other of said outwardly extending legs and clamping means for clamping said outer end portion against said stop means and substantially in said common plane.

35. Carriage means as set forth in claim 34 in which said first roller means comprises a pair of spaced apart rollers rotatably mounted on said carriage means adjacent and substantially parallel to said transverse leg portion and parallel to each other, and said second roller means comprises a pair of second rollers each being mounted in said cantilevered manner on an associated shaft extending inwardly from an associated one of said outwardly extending legs to thereby provide a comparatively large space between said pair of second rollers, said pair of rollers having their axes in a common plane while being arranged parallel to the axes of said first roller means, and said common plane being arranged between said outwardly extending legs.

36. The carriage as set forth in claim 35 further comprising compression spring means acting between one of said second rollers and its associated outwardly extending leg to thereby yieldingly urge its associated second roller toward the terminal end of its shaft and into yielding engagement against said opposite side of said elongated member, whereby said first and second roller means are thereby all yieldingly held against said elongated member to enable a smoother movement of said carriage along said elongated member.

References Cited

UNITED STATES PATENTS

| 673,991 | 5/1901 | Alden | 72—389 |
| 1,358,035 | 11/1920 | Soucy | 72—389 |
| 2,711,205 | 6/1955 | Brown | 72—389 |
| 3,347,073 | 10/1967 | Couture | 72—389 |

CHARLES W. LANHAM, *Primary Examiner.*

R. D. GREFE, *Assistant Examiner.*

U.S. Cl. X.R.

72—367, 389